United States Patent
Lucidarme

(10) Patent No.: US 7,113,782 B2
(45) Date of Patent: Sep. 26, 2006

(54) METHOD AND DEVICE FOR SELECTING PARAMETERS FOR A CELLULAR RADIO COMMUNICATION NETWORK BASED ON OCCURRENCE FREQUENCIES

(75) Inventor: Thierry Lucidarme, Montigny-le-Bretonneux (FR)

(73) Assignee: Nortel Networks Limited, St. Laurent (CA)

( * ) Notice: Subject to any disclaimer, the term of this patent is extended or adjusted under 35 U.S.C. 154(b) by 163 days.

(21) Appl. No.: 10/860,256

(22) Filed: Jun. 3, 2004

(65) Prior Publication Data

US 2004/0259565 A1 Dec. 23, 2004

(30) Foreign Application Priority Data

Jun. 20, 2003 (EP) ................... 03291524

(51) Int. Cl.
*H04Q 7/20* (2006.01)
(52) U.S. Cl. ............... 455/432.1; 455/433; 455/435.1; 455/436; 455/450; 455/452.1; 455/453; 370/331; 370/341
(58) Field of Classification Search ........... 455/432.1, 455/436–440, 442–445, 455, 450–453, 433, 455/435.1; 370/331, 332, 333, 334, 341
See application file for complete search history.

(56) References Cited

U.S. PATENT DOCUMENTS

| | | | | |
|---|---|---|---|---|
| 5,276,907 A | * | 1/1994 | Meidan | ...................... 455/436 |
| 5,428,817 A | * | 6/1995 | Yahagi | ........................ 455/446 |
| 5,805,996 A | * | 9/1998 | Salmela | ...................... 455/453 |
| 6,078,813 A | * | 6/2000 | Ljung | .......................... 455/436 |
| 6,141,565 A | | 10/2000 | Fenerstein et al. | |
| 6,944,463 B1 | * | 9/2005 | Gunreben et al. | .......... 455/453 |
| 6,975,869 B1 | * | 12/2005 | Billon | ..................... 455/452.1 |
| 2004/0043764 A1 | * | 3/2004 | Bigham et al. | .......... 455/422.1 |

FOREIGN PATENT DOCUMENTS

| | | |
|---|---|---|
| GB | 2 335 570 A | 9/1999 |
| GB | 2 361 385 A | 10/2001 |

* cited by examiner

*Primary Examiner*—Steve M. D'Agosta
(74) *Attorney, Agent, or Firm*—Trop, Pruner & HU, P.C.

(57) ABSTRACT

A method and apparatus for selecting a value of at least one network operating parameter, cell operating parameter, radio resource management parameter or dimensioning parameter for a cellular radio communications network having a base station and mobile units communicating therewith is described. A statistic is maintained of estimated mobile unit occurrence densities or estimated changes of mobile unit occurrence densities at locations in a cell. The selection of the value of the at least one network operating parameter, cell operating parameter, radio resource management parameter or a dimensioning parameter is made in accordance with an occurrence frequency density stored in the statistic. The apparatus and method are particularly suited for detection and remediation of hot spots.

19 Claims, 7 Drawing Sheets

METHOD AND DEVICE FOR SELECTING PARAMETERS FOR A CELLULAR RADIO COMMUNICATION NETWORK BASED ON OCCURRENCE FREQUENCIES

The present invention concerns methods and apparatus for the management of a cellular network of a wireless telecommunication system as well as the network itself and control and management devices for use in the network.

TECHNICAL BACKGROUND

In cell networks base stations serve mobile or fixed user equipment. Every base station has a limited radio coverage area. Radio resources in the form of frequency spectrum are reutilised among the cells to optimise the capacity of communications offered by the network. However, within one cell radio resources are restricted and these resources need to be managed efficiently. Various management procedures of the resources radio can be implemented, according to the choice of the operator, at the cell level or in the infrastructure of the cell network to optimise the employment of the frequencies and minimise interference.

As mobile telephone networks become more heavily used, the optimum use of available spectrum becomes very important. Any delay in making or terminating wireless communications, any unnecessary signalling or the use of an excessively high transmission power level will reduce the capacity of the system. However, obtaining optimised settings under all operating conditions is difficult.

A further difficulty is the rapidly varying traffic load in the cells. Depending on the time of day and public facilities provided within a cell, e.g. an airport or a football ground, large changes in traffic can occur, e.g. arrival of an aeroplane and all passengers turn on their mobile phones on disembarking, many making a phone call or accessing phonemail, termination of a football match followed by a large amount of messaging, etc. Areas of a cell having a high communication activity may be called "hot spots". One proposed solution to hot spot problems is to vary the charges in accordance with the loading on the cell, a) by charging high rates users are dissuaded from using the service or b) are prevented from doing so because their tariff agreement does not allow connection at the highest charging rates hich are imposed at high traffic levels.

EP 1090515 proposes a solution to some of the problems associated with adjusting network control parameters to changing situations. A scheme is proposed for selecting a value for a first radio resource management parameter by keeping a statistic of values measured on the radio channels of a quantity. A second parameter associated with the first parameter is adjusted so that a certain fraction, e.g. %, of the values in the statistic are above the selected value of the associated parameter. However, selecting the value of the associated parameter based on a value being representative of a certain fraction of measured values of a related quantity is not ideal for some of the wide variety of control parameters used in the management of a cellular network. In particular, depending on the occasion, a mobiles communicating from within hot spot might be have measured values at an percentage of the values in the statistic. Thus, the selection algorithm of EP 1090515 is not universally applicable and is in need of improvement.

Methods of determination of the location of mobile units have been known for some time. They may be grouped into cell based measurement techniques, cell ID techniques and global positioning techniques. The most accurate is the latter but requires that each mobile includes a GPS receiver. The least accurate is the cell ID method, but it involves the least effort as information as to the location of the mobile unit with respect to a location area or to a cell is required for paging purposes. Techniques based on measurements within the cell provide an intermediate accuracy, e.g. of one or more hundreds of metres, and are usually based on the measurement of delays of signals propagated within the cell. The delays from two or three known points can be reported then the location of the mobile unit may be obtained by triangulation methods. There are serious privacy concerns about recording accurate mobile unit location somewhere in the infrastructure without user agreement.

SUMMARY OF THE PRESENT INVENTION

It is an object of the present invention to provide an alternative selection algorithm as well as apparatus and a radio telecommunications system executing the algorithm for selecting a control parameter for the radio telecommunications system. In particular it is an aim of the present invention to deal with some effects of hot spots on cellular system management and in particular on resource management.

The present invention provides a method of selecting a value of at least one network operating parameter, cell operating parameter, radio resource management parameter or dimensioning parameter for a cellular radio communications network having a base station and mobile units communicating therewith, wherein a statistic is maintained of estimated mobile unit occurrence densities or estimated changes of mobile unit occurrence densities at locations in a cell, and the selection of the value of the at least one network operating parameter, cell operating parameter, radio resource management parameter or a dimensioning parameter is made in accordance with an occurrence frequency density stored in the statistic.

The statistic can be determined from delays measured on in-bound voices and data calls and/or on angles of arrival measured on in-bound voices and data calls.

The method may be used for detecting a hot spot in a cell or cells based on the statistic. Locations of mobile units required to generate the statistic can be determined from mobile units in soft handover.

A handover threshold can be increased temporarily to increase the number of mobile units in soft handover thus increasing the number of mobile units contributing to the statistic.

The parameter to be selected can be selected from one of: a sector angle at a base station, an antenna angle or antenna direction, a direction of a beam of a beam former, a modulation or channel coding to be used with a transmission, a puncturing scheme to be used with a transmission, a frequency band to be used for a transmission, a start of a search window for synchronising to a mobile unit, a spreading code to be used for a transmission, a scrambling code to be used for transmissions.

The present invention also provides a cellular radio communications network having a base station and mobile units communicating therewith comprising: means for maintaining and storing a statistic of estimated mobile unit occurrence densities or estimated changes of mobile unit occurrence densities at locations in a cell, means for selecting a value of at least one network operating parameter, cell operating parameter, radio resource management parameter or dimensioning parameter for the cellular radio communications network, the means for selecting makes the selection in accordance with an occurrence frequency density stored in the statistic.

The means for maintaining the statistic can comprise means for determining the statistic from delays measured on in-bound voices and data calls and/or from angles of arrival measured on in-bound voices and data calls.

The network may also include means for detecting a hot spot in a cell or cells based on the statistic.

The present invention also provides a network element for use with cellular radio communications network having a base station and mobile units communicating therewith, comprising: means for maintaining and storing a statistic of estimated mobile unit occurrence densities or estimated changes of mobile unit occurrence densities at locations in a cell. The element may comprise means for analysing the statistic and detecting a hot spot in a cell or cells based on the statistic. The element may further comprise means for determining a transmission delay from a mobile unit in a detected hot spot and a base station.

The network element can be a base station, a location measurement unit, an operations and maintenance unit, a base station controller, a switching unit, a radio network controller, a serving mobile location centre or similar.

The present invention will now be described by reference to the following drawings.

DESCRIPTION OF THE ILLUSTRATIVE EMBODIMENTS

Figure 1:
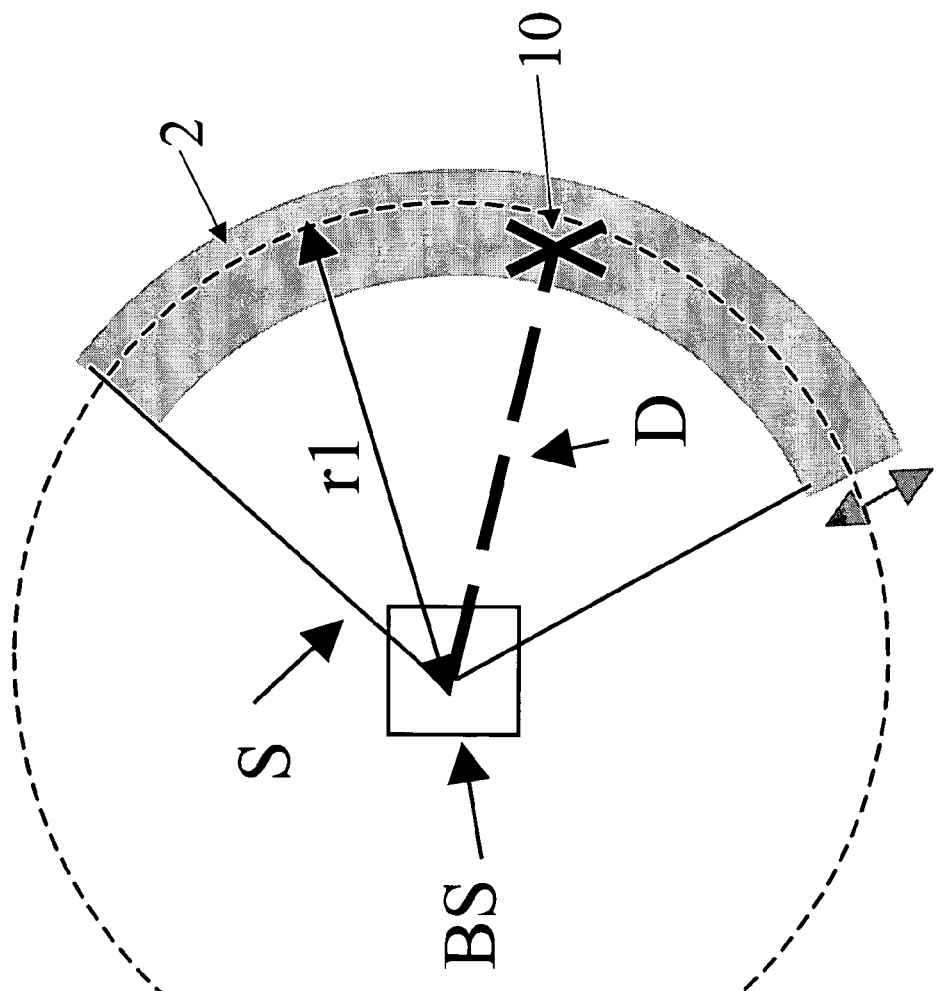
FIGS. 1 to 4 are schematic diagrams of mobile location arrangements usable by the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The present invention may be used with any suitable cellular radio network, e.g. those covered by the standards of GSM (see for example "The GSM System for Mobile Communications", Mouly and Pautet, Cell & Sys, 1992), IS95 (see for example "CDMA Systems Engineering Handbook", Jhong Sam Lee and Leonard E. Miller, Artech House, 1998), UMTS (see the book by Prasad and Ojanpera mentioned above), IS 136 (see the book "IS-TDMA Technology, Economics and Services", Lawrence J. Harte, Adrain D. Smith and Charles A. Jacobs, Artech House, 1998, "WCDMA for UMTS", H. Holma et al. Wiley, 2001 or similar. Particularly spread spectrum systems, especially direct sequence spread spectrum systems, whether wide band or narrow band, such as CDMA networks, for example UMTS or IS-95 or CDMA2000, thanks in part to their ability to resolve the channels e.g. using Rake receivers, based on accurate timing delay measurements, can be advantageously tuned and operated in accordance with the present invention.

In the following reference will be made to "delays" or "time delays". These terms should be interpreted broadly and include "time differences" and "lapsed times". In wireless networks, radio signals are sent between transceivers. Each signal takes a certain time to arrive at its destination. This is a "delay". The delay is related to the distance between the transceivers and assuming that the delay can be measured accurately and accurate estimate for the distance between the two transceivers can be calculated. One simple delay which is useful in estimating distances is the "round trip time" (RTT) or "round trip delay" (RTD), that is the time taken for a radio signal to travel from one transceiver to another and back again. From the lapsed time for this procedure the distance between the transceivers can be calculated. The present invention can utilize RTT and also more complex delay acquisition systems. For example, where clocks are synchronized or the offsets between clocks are known, the time of flight between a mobile unit and a base station or vice versa can be measured directly.

Reference will also be made to "mobile units" which can be mobile telephones or laptops with mobile termination, or for example, portable, pocket, hand-held, computer-included, or car-mounted mobile devices which communicate via voice and/or data/multimedia.

In the following reference to "RNC" may be considered as the same as base station controller and "Node B" may be considered as the same as base station.

One aspect of the present invention will be illustrated with reference to cellular hot spots. Hot spots are interesting from the management point of view because they are generally associated with a higher probability of a mobile communication being initiated from a certain geographical region within a cell than from within other regions of the cell. Thus, one of the challenges of hot spot control is to adapt the operation of a cell optimally to the existence of a hot spot and to tear down any such adaptation as soon as the hot spot no longer exists. One important aspect such an optimised process is the identification of the presence of a hot spot. A hot spot is an area of a cell or cells in which there is a higher than usual density of communicating mobiles. For example, a hot spot may be defined as a region of a cell or cells in which there are three or more times, e.g. 10 times the number of communicating mobile units than the average for the cell or cells. Hot spots are also generally associated with a higher than usual number of new communications, e.g. persons leaving a pop concert or a foot ball match. Unable to telephone during the event because of the noise, they take the opportunity afterwards to order a taxi, inform their friends, book a place at a restaurant, etc.

One property of communications from hot spots used by the present invention is that some characteristics of such transmissions are likely to be highly correlated. For example, due to the fact that mobiles in a hot spot are located within a restricted geographical area, the time delay for a communication from a mobile unit to reach a base station or to be received by a mobile unit from a base station will be very similar for all the mobile units in a hot spot. In accordance with one aspect of the present invention this similarity can be used to identify the emergence and/or presence of a hot spot. In accordance with a further aspect of the present invention, the identification of a hot spot leads to a particular selection of a network management parameter, a cell or radio resource parameter, a network planning parameter. etc.

In a first embodiment of the present invention a cellular network monitors a time delay related to the distance of a mobile unit from a base station or from another transceiver, e.g. transceivers dedicated to location services. It is not necessary that the system has a method of accurately locating the position of a communicating mobile unit. The measured delay can be for example, the Round Trip Time (RTT). A statistic of this delay is then maintained within the network. The statistic is updated at regular intervals. The acquisition of the delay information may be made with the assistance of the mobile units or may be provided by the mobile units to the base station. The time delay may also be a delay measured between a mobile unit and a radio transceiver which is itself not a base station. In such a system transceivers are erected in the cells for the specific purpose of carrying out time delay measurements, e.g. for location services. They need not be conventional base stations handling traffic but they are connected to the network at some point, e.g. via a land cable or wireless connection to base station. The measured delay times are then transmitted to the network from the special transceivers and stored as a statistic at a suitable location within the network.

In one aspect of the present invention the measured time delays are stored as an occurrence matrix of which a histogram is a one-dimensional example. Values for delays such as RTT are "binned", that is values within specific ranges are assigned as counts or a measure of an occurrence frequency for that bin. An example is given below:

$$[D_1 \ldots D_i \ldots D_p]  \qquad \text{Eq. 1}$$

where $D_i$ is the current count of occurrences of measured values of a relevant measured parameter such as a time delay which falls within a bin i of p bins. For each bin i the relevant parameter such as a delay has a value within the range for that bin, e.g. for bin i the values of a time delay such as the RTT which are relevant to this bin are within a range $d^{upper}$ to $d^{lower}$. These values are related to a range of distances from the base station to a mobile unit. That is from these values $d^{upper}$ to $d^{lower}$, estimated maximum and minimum distances of a ring around the base station could be calculated. Each bin therefore represents a range of estimated distances from the base station.

The bin boundaries such as $d^{upper}$ to $d^{lower}$ can be preset or can be dynamically set. In the latter case bin boundaries may be selected by searching, for example, for naturally occurring minima in the occurrence frequencies. A histogram may be described as a one-dimensional occurrence matrix or an occurrence matrix of the first order.

Figure 2:
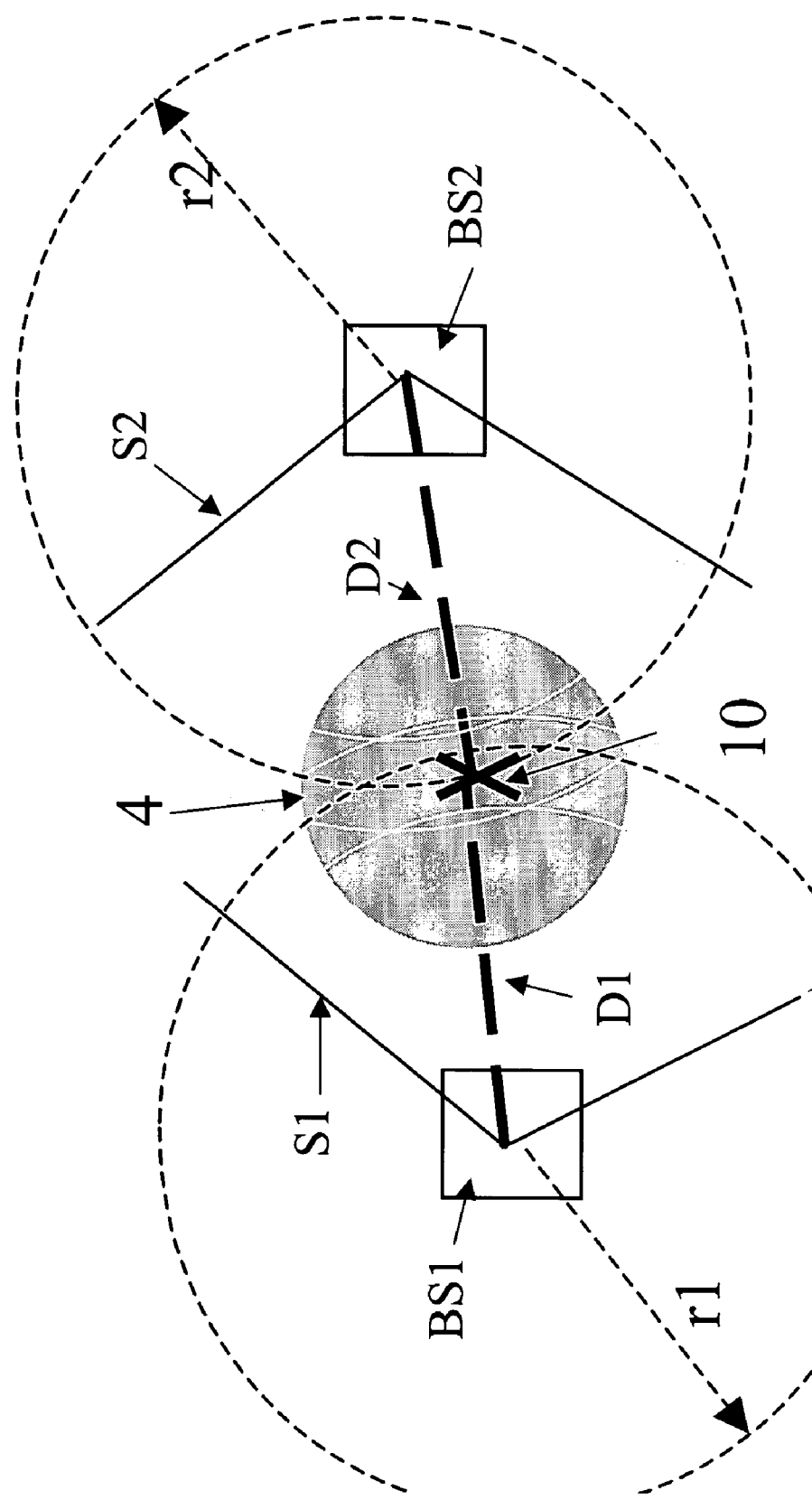
Figure 3:
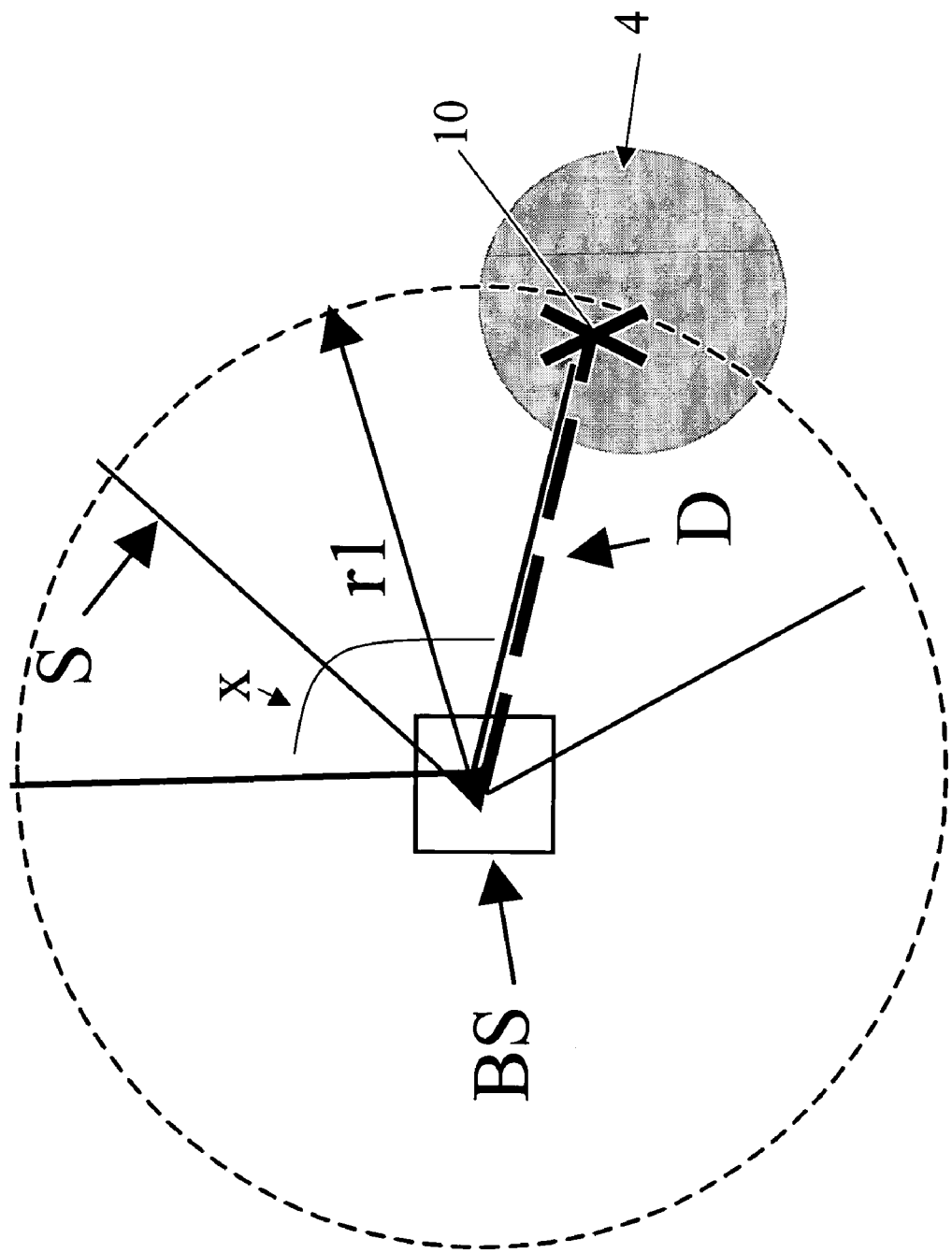
Figure 4:
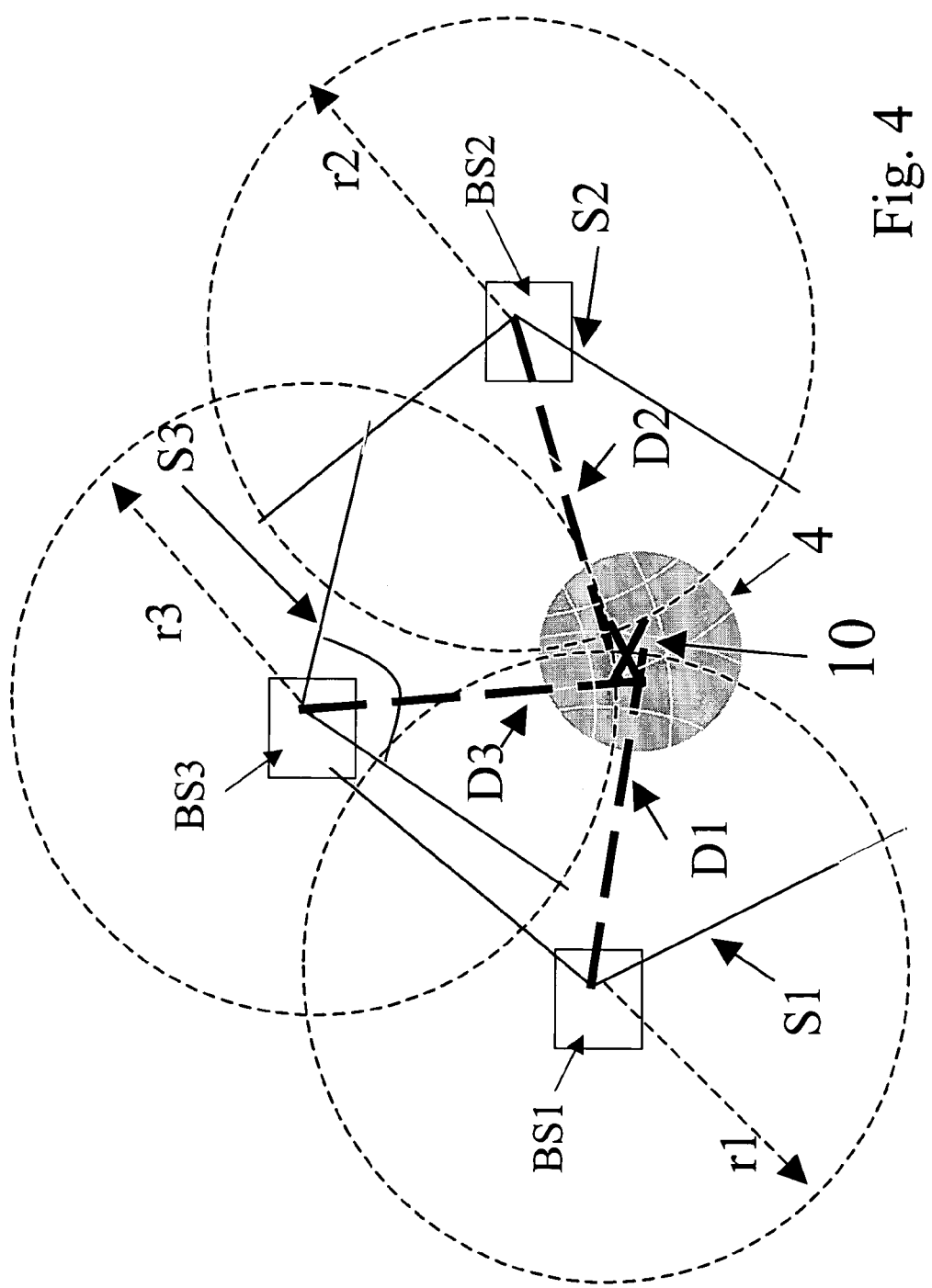

A histogram of time delays between mobile units and a base station BS or other transceiver located at a distance D from a mobile unit 10 the within a cell only defines a ring 2 at a radius r1 indicating possible positions of relevant mobile units 10 in a network (see FIG. 1). If the base station BS is sectored, the ring 2 may be reduced to a quadrant of a circle if it is known that the mobile unit 10 is within one sector S. This may be sufficient to determine that a hot spot exists although the exact location of the hot spot is not known. In order to obtain a more accurate position of a hot spot additional parameters are required. These may be selected from one or more of:

a) A further time delay available from an independent source, e.g. a base station or another transceiver. With two delays a simple position estimate may be made—see FIG. 2. In this case two base stations BS1 and BS2 are in soft handover communication with a mobile unit 10. The delays due to transmission distances D1 and D2 of transmissions to and from a mobile unit 10 from and to the base stations BS1 and BS2 are stored in an appropriate form as a statistic. From these delays/distances a region 4 is defined indicating possible positions of relevant mobile units 10. To solve ambiguities other data may be used, e.g. if BS1 and BS2 have sectors S1 and S2, respectively, the location of the mobile unit 10 in these sectors S1 and S2 can be used to confirm the general location of a mobile unit 10.

b) An angle of arrival at a base station or another transceiver. Where the angle of arrival "x" at a base station or other transceiver can be measured and recorded the combination between this measured angle x and the time delay or corresponding distance D can be used to obtain more accurate information as the location region 4 of a communicating mobile unit 10—see FIG. 3. Angle of arrival at a base station BS may be determined, for example, when communications from mobile units 10 are tracked by base stations having beam formers having a narrow azimuth angle. Alternatively, where a base station has a antenna array, the differences in the signals received by two or more elements of the antenna array from a single mobile unit can be used to determine an angle of arrival of the signal—see for example, "Performance of a TDOA-APA hybrid mobile location system", N. J. Thomas et al. and "Performance assessment of terrestial and satellite based position location systems", D. Kothris et al. Second Conf. On 3G mobile telecommunications Technologies, pages 211 to 215, 26–28 Mar., 2001 London, UK. When a base station has both main and diversity antennas, the degree of correlation between signals received by the two antennas from a single mobile unit can be used to provide an angle of arrival.

c) Two further time delays available from two further independent sources such as base stations or other transceivers (see FIG. 4). In this case a mobile unit 10 is in soft handover communication with three base stations BS1–3. With a total of three time delays and/or their corresponding distances D1–D3 a proper triangulation can be carried out to locate a more accurate region 4 where the mobile unit 10 is likely to be. Where the base stations BS1–3 have sectors S1–3, the location of the mobile unit in these sectors can be used as a confirmation of the general location of the mobile unit 10.

d) A further time delay and an angle of arrival at a base station or another transceiver. This effectively provides three independent values from which a triangulation may be made. It is generally preferred in accordance with the present invention that the statistic of the densities of communicating mobile unit is constructed based on location methods which involve at least three independent measurements of an angle, distance, delay etc.

Where a mobile unit has a GPS receiver, the information on the position of the mobile unit may be transmitted from the mobile unit to a base station on a suitable radio channel and no time delay information is required. Alternatively, the GPS positioning data may be combined with time delay information, e.g. the GPS positioning data may be obtained only rarely and the time delay information is used to provide an up-to-date estimate of the position of the mobile unit.

In the collection of the above mentioned statistic, explicit reference to mobile units such as individual IMSI's or directory numbers can be discarded so that the occurrence matrix is anonymised does not compromise privacy.

The calculation of distance estimates from the time and/or angle measurements as indicated above takes up processor power and is an optional method in accordance with the present invention. To detect hot spots it need only be necessary to store the received data in a co-occurrence matrix. Such a co-occurrence matrix may be as follows:

$$[D_1^{d,a} \ldots D_i^{d,a} \ldots D_p^{d,a}] \qquad \text{Eq. 2}$$

where $D_i^{d,a}$ is the current count of co-occurrences of measured values of two relevant measured parameters such as a time delay and a received angle at the base station which fall within a bin i, whereby both parameters are measured for communications from the same mobile units. For each bin i the two relevant parameters such as a delay and a received angle at the base station have values within the range for that bin, i.e. for bin i the delay values, e.g. RTT values, are within the range $d_i^{upper}$ to $d_i^{lower}$, whereas the range of received angle at the base station is within a range $a_i^{upper}$ to $a_i^{lower}$. These values are related to not only to a distance from the base station to a mobile unit but also to an approximate position in the cell of the relevant mobile unit. That is from these values, an estimated distance and a rough position can be calculated. Each bin therefore represents a range of distances from the base station and a possible geographical area for the location of the mobile.

Hence, in order to detect a hot spot it is only necessary to monitor the development of the counts of $D_i^{d,a}$. When the counts in one or more bins rise rapidly then this is an indication of a hot spot developing. The calculation of the distance or the position is not a necessary requirement for the present invention particularly when each bin defines a unique definition of a geographical distance from, or geographical position with respect to, the base station as described above.

The one dimensional arrays of Equations 1 and 2 do not provide very much information on the position of the hot spot within the cell. In another embodiment of the present invention a two dimensional occurrence or co-occurrence matrix is stored. In this two dimensional array, the element position in the array bears some relationship to the position in the cell of the relevant mobile units. An example of such an array is shown schematically below:

$$\begin{bmatrix} D_{11}^{a,d} & . & . & . \\ . & . & . & . \\ . & D_{ij}^{a,d} & . & . \\ . & . & . & D_{p,q}^{a,d} \end{bmatrix} \qquad \text{Eq. 3}$$

Similar to Eq. 2, each element $D_{11}^{a,d}$ is the current count of co-occurrences of measured values of two relevant measured parameters such as a time delay and a received angle at the base station which fall within a bin ij, whereby both parameters are measured for communications from the same mobile units. For each bin ij the two relevant parameters such as a delay and a received angle at the base station have values within the range for that bin, i.e. for bin ij the delay values, e.g. RTT values, are within the range $d_{ij}^{upper}$ to $d_{ij}^{lower}$, whereas the range of received angle at the base station is within a range $a_{ij}^{upper}$ to $a_{ij}^{lower}$. In addition, in this array, the element position in the array is mapped approximately onto the actual geographical position in the cell, at least topologically. In a topological representation only the relative positions of the geographic locations are maintained, not their absolute relative positions (which would be a topographic representation). Thus, the array which stores the statistic comprises a plurality of elements, the elements being populated with counts of the number of communicating mobile units within geographical areas in a cell, each element of the array having a topological relationship with the corresponding geographical area, topologically related to the elements With this type of array, hot spots that involve more than one bin can be detected more easily as these bins will be located adjacent to each other in the array. Note that where the two measured parameters are time delays; a topologically correct array requires that a the delays are converted into a rough geographic position within the cell. For example an area within a cell may be defined by polar co-ordinates, r (radius) and θ (angle) with the base station taken as the origin. In this case the bin boundaries define a range $r^{upper}$ to $r^{lower}$ and $\theta^{upper}$ and $\theta^{lower}$. In order to populate the array with occurrence frequencies it is necessary to convert the measured delay values to the relevant co-ordinates.

The extension to three or more values to define each bin is also included within the scope of the present invention. For example, Eq. 2 may be stored as shown schematically in Eq. 4 and Eq. 3 may be stored as shown schematically in Eq. 5.

$$[D_1^{d,a,s} \ldots D_i^{d,a,s} \ldots D_p^{d,a,s}] \qquad \text{Eq. 4}$$

$$\begin{bmatrix} D_{11}^{a,d,s} & . & . & . \\ . & . & . & . \\ . & D_{ij}^{a,d,s} & . & . \\ . & . & . & D_{p,q}^{a,d,s} \end{bmatrix} \qquad \text{Eq. 5}$$

Each element $D_1^{a,d,s}$ in Eq. 4 is the current count of co-occurrences of measured values of three relevant measured parameters such as two time delays and a received angle at the base station which fall within a bin i, whereby all three parameters are measured for communications from the same mobile units. For each bin i the three relevant parameters such as two time delays and a received angle at the base station have values within the range for that bin, i.e. for bin i the first delay value, e.g. an RTT value, is within the range $d_i^{upper}$ to $d_i^{lower}$, whereas the range of received angle at the base station is within a range $a_i^{upper}$ to $a_i^{lower}$ and the range of second delay value, e.g. a further RTT value from an independent transceiver, is within the range $s_i^{upper}$ to $s_i^{lower}$. The same principles can be applied to Eq. 5, except that a two dimensional array is stored.

In Eqs. 2 to 5 above reference has been made to two parameters such as a time delay and an angle but the present invention is not restricted thereto but includes any suitable combination of values of parameters which define at least an approximate distance from the base station and/or an approximate geographical location or area with respect to the base station.

The present invention also includes hybrid occurrence or co-occurrence matrices. One example is shown schematically in Eq. 6 which is a modification of Eq. 4. The same principles may be applied to any of Eqs. 1 to 3 and 5.

$$\begin{bmatrix} D_{11}^{d,s} & . & . & . \\ . & . & D_{i-1,j+1}^{a,d} & . \\ . & D_{ij}^{a,d} & . & . \\ . & . & . & D_{p,q}^{d,s} \end{bmatrix} \qquad \text{Eq. 6}$$

In this embodiment it is assumed that mobile units communicating close to the base station (and therefore close to the centre of the array of Eq. 6) have a small value of the time delay d, e.g. the RTT for the mobile unit in the home cell. For such mobile units the angle of arrival at the base station is a more accurate measurement of the angular position of the mobile unit with respect to the base station and also defines a small geographic area. Hence, for these elements of the array, the two parameters of a time delay d and an angle a may be used to define the bin for these elements. On the other hand, at remote locations with large RTT's the angle of arrival is not so accurate (multipath reflections render the final arrival angle inaccurate) and anyway an angle defines a large geographic area at large distances from the base station. In this case two or more time delays d, s are used to define the bin boundaries. As the remote mobile units are likely to be in soft handover as they are close to the cell boundary, the provision of two delay values, e.g. two RTT's one from the home cell and one from an adjacent cell is practically possible (see FIG. 2).

As indicated above, each element of the occurrence matrix or co-occurrence matrix can be mapped to a certain geographic are of the cell. For the element ij of such a matrix this area can be described as $A_{ij}$. Eq. 7a is an occurrence matrix derived from Eq. 5 which has been normalised with respect to area so that the counts $F_{ij}$ are given by Eq. 7b.

$$\begin{bmatrix} F_{11}^{a,d,s} & . & . & . \\ . & . & . & . \\ . & F_{ij}^{a,d,s} & . & . \\ . & . & . & F_{p,q}^{a,d,s} \end{bmatrix} \qquad \text{Eq. 7a}$$

$$F_{ij}^{a,d,s} = D_{ij}^{a,d,s}/A_{ij} \qquad \text{Eq. 7b}$$

Further normalised occurrence matrices are included within the scope of the present invention. For example, the counts of the elements of the matrix may be normalised for the total number of communicating mobile units in the cell. If the number of communicating mobiles in the area $A_{ij}$ corresponding to the element ij of the occurrence matrix of Eq. 7a is $D_{ij}$ however this is determined, then the matrix of Eq. 8a gives the values of the number of communicating mobile units normalised with respect to the total number of communicating mobile units in the cell as defined by Eq. 8b.

$$\begin{bmatrix} G_{11}^{a,d,s} & . & . & . \\ . & . & . & . \\ . & G_{ij}^{a,d,s} & . & . \\ . & . & . & G_{p,q}^{a,d,s} \end{bmatrix} \qquad \text{Eq. 8a}$$

$$G_{ij}^{a,d,s} = D_{ij} \cdot \sum_{1,1}^{p,q} A_{ij}/A_{ij} \cdot \sum_{1,1}^{p,q} D_{ij} \qquad \text{Eq. 8b}$$

A further interesting value to calculate or store is the differential of each current count with respect to time. This will only be shown schematically with reference to Eq. 5:

$$\begin{bmatrix} \Delta D_{11}^{a,d,s} & . & . & . \\ . & . & . & . \\ . & \Delta D_{ij}^{a,d,s} & . & . \\ . & . & . & \Delta D_{p,q}^{a,d,s} \end{bmatrix} \qquad \text{Eq. 9}$$

The value $\Delta D_{ij}^{a,d,s}$ in the element ij of Eq. 9 represents a differential with respect to time of the corresponding value $D_{ij}^{a,d,s}$ of Eq. 5 (or the equivalents of Eqs. 1 to 4 and 6 to 8). This differential can be useful as it is an early-warning indicator of the growth of a hot spot. This value can allow early cell re-configuration if a large hot spot is becoming evident. Viewing a hot spot with reference to the rate of new originating calls provides an alternative definition of a hot spot—the number of new originating calls to or from mobile units from within a geographical region less than 10% of the area of a cellular region (e.g. the complete cell or a sector of a cell) is more than 3% of the capacity of that cellular region.

For systems in which a method or methods for the location of mobile units is already provided, the present invention can make use of this existing method or these methods to prepare the statistics for the communicating mobile units. High precision mobile unit location methods have become important for mobile telecom networks first in USA, then in Europe. 3GPP standards allows a variety of methods: e.g. Cell-ID, OTDA (observed time difference), GPS assisted, U-TDOA (Uplink time difference of arrival) etc. Basic definitions and methodology are provided in 3GPP TS 25.305 V5.5.0 (2003-3), 3GPP TR 25.923 V1.0.0 (1999-04), 3GPP TR 25.85O V4.3.0 (2001-12) and 3GPP TS43.509 V6.0.0 (2003-04). All 3GPP standards can be found at FTP://FTP.3GPP.ORG.

For example the network may implement a location method such as OTDA (observed Time difference of arrival) or UTOA (Uplink time of arrival) or U-TDOA which does not need significant collaboration from the mobile units. These methods are defined and specified for example for GSM and UMTS.

Figure 5A:
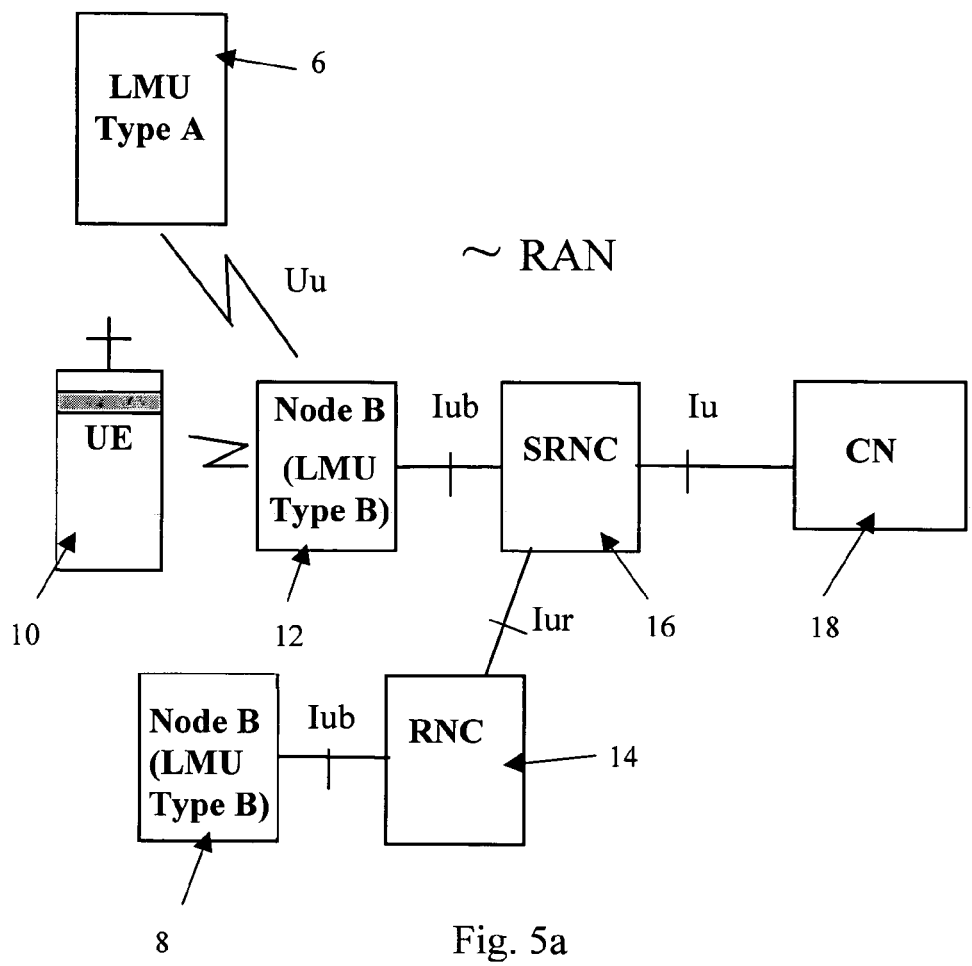
FIGS. 5a and 5b are schematic representations of parts of a wireless network usable by the present invention.

FIG. 5a shows a general arrangement of one example of a mobile unit positioning feature in a UTRAN as may be used with the present invention. In a typical cellular radio system, mobile units communicate via a radio access network (RAN) to one or more core networks CN (18). The radio access network (RAN) covers a geographical area which is divided into cell areas, with each cell area being served by a base station (Node B, 8, 12). A cell is a geographical area where radio coverage is provided by the radio base station equipment at a base station site. The base stations communicate over the air interface (e.g., radio frequencies) with the mobile stations 10 within range of the base stations 8, 12. In the radio access network, several base stations are typically connected (e.g., by landlines or microwave) to a radio network controller (RNC, 14, 16) or base station controller. The radio network controller supervises and co-ordinates various activities of the plural base station sites connected thereto.

An example of a radio access network is the Universal Mobile Telecommunications (UMTS) Terrestrial Radio Access Network (UTRAN). The UTRAN is a third generation system that in some respects builds upon and extends the radio access technology known as Global System for Mobile communications (GSM). UTRAN is a wideband code division multiple access system (W-CDMA). In a wide band CDMA system a common frequency band allows simultaneous communication between a mobile unit and a plurality of base stations, e.g. in soft handover.

Communication among the UTRAN mobile unit position locating entities makes use of the messaging and signalling capabilities of the UTRAN interfaces (Iub, Iur). Conventionally, an RNC 16, receives authenticated requests for mobile unit positioning information from the Core Network 18 across the Iu interface. RNCs manage the UTRAN resources (including Node Bs, LMUs) and the mobile units 10 and can optionally handle the calculation functions to estimate the position of the mobile units 10 and return the result to the core network 18. This calculation function may be located at other positions in the network if more convenient, e.g. in a special unit the SMLC 20—see FIG. 5*b*. The first RNC 16 may also make use of the mobile unit Positioning function for internal purpose e.g. position based handover.

A Location Measurement Unit (LMU) entity (6, 8, 12) makes measurements (e.g. of radio signals on radio channels) and communicates these measurements to its relevant RNC 14, 16. An LMU 6, 8, 12 may also perform calculations associated with these measurements, e.g. calculate distances or apply filtering methods to improve accuracy.

An LMU 6, 8, 12 may make its measurements in response to requests (e.g. from an RNC), or it, especially in accordance with the present invention, it may autonomously measure and report regularly (e.g. report the timing of Node B transmissions) or when there are significant changes in radio conditions (e.g. changes in the UTRAN GPS timing of cell frames or SFN-SFN Observed Time Difference). There may be one or more LMU's 6, 8, 12 associated with the UTRAN and a mobile unit Positioning request may involve measurements by one or more LMU 6, 8, 12. An LMU 6, 8, 12 may be used, for example, to measure UTRAN transmissions either uplink or downlink. These measurements may be made either, for example, to locate the mobile unit 10 or to measure a system parameter needed by the mobile unit Positioning such as a timing offset (e.g. UTRAN GPS timing of cell frames or SFN-SFN Observed Time Difference) of transmissions of Node Bs. An LMU 6, 8, 12 may also measure other transmissions, such as those of satellite navigation systems (i.e. Global Positioning System—GPS) and either report the measurements for use by an RNC 14, 16, or report the positioning results as determined by internal calculations of the LMU.

An LMU makes radio measurements to support one or more positioning methods. These measurements fall into one of at least two categories:

(a) positioning measurements specific to one mobile unit and used to compute its position;

(b) assistance measurements applicable to all mobile units in a certain geographic area.

There are two classes of LMU:

Stand-Alone LMU (6): communicates with RNCs (12) via the Uu interface;

Associated LMU (8): communicates with RNCs (14) via the Iub interface. The associated LMU signalling protocol is the NBAP. The protocol for stand-alone LMU UTRAN signalling is the RRC protocol.

Figure 5B:
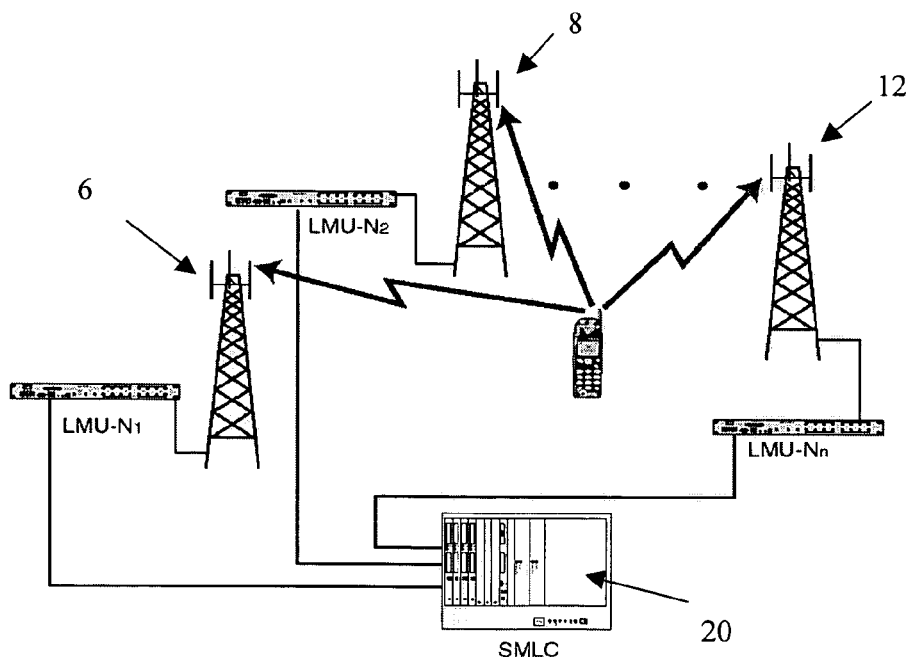

As an example the OTDOA technique may be used to measure signals transmitted by the mobile unit 10—see FIG. 5*b*. Base stations and LMU's (Node B, 8, 12; 6) which are able to receive signals from a mobile unit 10, and which share a suitable reference time, may each measure the time of arrival of signals from the mobile unit 10. These times-of-arrival may be used to estimate the distance to the mobile unit 10 and hence derive a location estimate. These calculations may be carried out in an SMLC 20 which may be located appropriately in the network to be accessible from the relevant base stations.

The LMU 6, 8, 12 listen to the downlink reference signals transmitted by the NodeBs to learn the RTD (SFN(nodeBi)-SFN(NodeBj)) and also has to measure the arrival time of one slot signal based on a known reference. In some cases, accumulation of signals can be made (repetition of RACH) to improve the measurement accuracy including high order statistics detection.

Usually the location of a mobile unit is done for emergency, police or security purposes, or if someone wants to locate someone else, it can be done with the authorisation of the first person. In accordance with the present invention the location methods are performed by the operator for a given duration on a given number of mobile units, e.g. randomly selected in all the cells for operation purpose. The mobile unit location statistic is built in one of the ways mentioned above. As the information linking the statistic to individual mobile units is lost, there is no privacy issue to be considered.

In dependent of which method is used to locate mobile units each value within a bin of the occurrence matrix of Eq. 1 or of the co-occurrence matrices of Eqs. 2 to 8 represents the current counts of mobile communications which involve mobile units within a distance range from the base station, the distance range being determined by the values of the bin boundaries. Hence, the counts in each bin represent a communicating mobile unit density within the cell as they are the number of mobile units within a certain geographic area which are communicating. In accordance with an aspect of the present invention a network management parameter, a cell management parameter or a radio resource parameter are adjusted in accordance with a communications density stored as a statistic in the form of an entry in an occurrence matrix or a co-occurrence matrix.

From the above the skilled person will appreciate that a method of maintaining a statistic for a cellular radio communications network having a base station and mobile units communicating therewith has been described, wherein the statistic includes estimates of mobile unit occurrence densities at locations in a cell. The statistic is updated regularly. The present invention also includes the selection of a value of at least one network operating parameter, cell operating parameter, radio resource management parameter or dimensioning parameter in accordance with an occurrence frequency density stored in the statistic as will be explained below.

In accordance with an embodiment of the present invention use is made of the knowledge of statistics of time delays in one cell or more cells. As explained above this statistic gives at least approximately the indication whether mobile units in a cell are quite far or quite near to the base station in the cell. This statistic may be used for link adaptation. For CDMA packet data applications such as HSDPA (high speed downlink packet access), it is possible to change the coding scheme and/or the modulation according to the radio conditions. Similar coding schemes are available in GPRS-EDGE, e.g. CS1, CS2 . . . CS9. For instance, there are several possible coding schemes for HSDPA and 2 possible modulations (QPSK,QAM16) specified in 3GPP TS 25.214 V5.4.0. In a lot of cases, allowing transitions between all the possible codes and modulations can be counter-productive as the measurements performed on radio channels are often not reliable enough to take a good decision. For instance, for EDGE, only 1 code (for instance CS2 in some cells and CS3 in the others) is implemented by the operator in a cell depending on the quality of the channels in the cell, e.g. the level of interference. It is then more efficient to use a subset of codes and modulation (for instance QPSK and MAQ16 only) from among all the possible codes and modulation schemes in order to optimise the tuning of the network versus the quantity of signalling and complexity through the network. For HSDPA the number of possible coding is given in standard 3GPP 25214, §6A.2. According a Channel Quality Indicator, (CQI) measured by the mobile unit, a puncturing scheme is chosen allowing more or less puncturing of transmitted data blocks according to the radio conditions. Table 7.A of this standard allows for instance 30 different coding schemes. The subset of codes and modulation is chosen in accordance with an embodiment of the present invention according to the knowledge of where are the majority of the mobiles, e.g. in accordance with the hot spots. A cell with a lot of remote mobiles will use preferably a subset with robust combination of codes and modulation. For instance only coding scheme 2-5-10 with QPSK and 20 with 16 QAM of table 7A. A cell with a lot of mobiles close to the base station preferably uses a subset using a high level of puncturing, for instance 5 with QPSK and 16-20-25 with 16 QAM codes, in order to increase the capacity of the cell by reducing traffic. In accordance with this embodiment only transitions between codes among this subset can be used.

In accordance with a further embodiment of the present invention a spreading code may be selected for a spread spectrum system such as a direct sequence spread spectrum system (e.g. CDMA) based on, the statistics. A cell or a sector of a cell is generally provided with one scrambling code in the downlink. Base stations communicating with mobile units in hot spots may be provided with one or more additional spreading codes, e.g. one or more additional scrambling codes in order to avoid channelisation code (OVSF) shortages.

In accordance with a further embodiment of the present invention the choice of frequency spectrum managed by the operator can be influenced the statistics relating to occurrence density. For example, an operator X is a licensed operator for multiple spectra which may be assigned to different standards. e.g. a UMTS frequency band (e.g. around 2100 MHz), an IS-95 frequency ban (e.g. around 1900 MHz) or a GSM frequency band (e.g. around 900 MHz) and even a frequency band which re-uses the legacy analog bandwidth at 450 MHz. If the majority of mobile units are remote from the base station, and if the mobile units are multimode units which are able to receive several bands of frequencies and/or communications governed by different standards, then the operator may chose to allocate a radio resource in a low frequency range in order to provide service to remote mobile units at long range and at a lower power level. For instance, if a lot of calls are being supported from a far point (e.g. an off-shore platform, winter station etc . . . ) then the frequency allocated for the whole cell could be 900 MHz or 450 MHz, whereas, if it is a more conventional urban or suburban land cell it the operator selects a UMTS frequency band.

In a further embodiment the statistics are used to tune "dynamically" transmission and reception operating conditions of a base station. For example, the tilt and the antenna bearings may be adjusted to be directed in a particularly favourable direction for the hot spots identified by methods according to the present invention. Base stations with "smart antennas" may use the statistical delay information to direct the antennas so as to preferentially receive communications from mobile units in the hot spots. For example, base stations with beam formers may direct the beams towards hot spot areas. Where base stations are sectored the angle of each sector may be set in accordance with the statistical information on delays. For example, when a hot spot has been detected, a sectored base station with normally three 120° sectors, can adapt the sector angles (by adjusting the antenna arrangements and phases) so that the hot spot is included in a sector with a small angle, e.g. 40° and the other two sectors may be widened to 160°. Where two hot spots occur in one sector the sector angles may be rotated so that there is only one hot spot in each sector. Hence, in accordance with the present invention load balancing adjustments can be made based on the delay statistics.

Further, the presence of identified hot spots can be used to plan the need and location of new cell sites, either micro- or macro-cell sites in order, for example, to have a "balanced" network. As an example of a balanced delay the present invention can be used to design cell sites with no extreme delay distribution allowed because of power wasting and can be used to optimize the CAPEX of a network. In accordance with an embodiment of the invention, the network may be configured to archive the statistic over a period of time for one or more cells, e.g. by executing a suitable background data collection and storing routine. Each statistic gives a snap-shot of the activity in a cell at a particular time and this information can be used to redesign the network, e.g. cell planning, placement of new cell sites, or micro- or macro-cell sites.

This statistics may also be used for network maintenance and repair. A sudden variation of the delay distribution inside one or several cells as detected by the present invention may indicate a power, a jamming or a SHO failure and generate an alarm condition.

In a further embodiment of the present invention transmit diversity can be selected depending upon the values in the occurrence matrices of the present invention. Transmit diversity may be used by a base station especially for hot spots detected, for example at remote locations of the cell. Under normal conditions without hot spots, this method of transmission is stopped. Hence, in accordance with an embodiment of the present invention, transmit diversity is activated or suppressed based on the delay statistic.

A further embodiment of the present invention particularly concerns a soft handover situation for a mobile unit having one connection already established with a first base station (Node B), a further connection to be established with a second base station (Node B). In this embodiment the statistic of occurrence densities of communicating mobiles can be used to control completion of a successful soft handover. Space diversity is attained by providing multiple signal paths through simultaneous links from a mobile unit to two or more base stations in soft handover. After a call is initiated and established between a mobile unit and a first base station, the mobile unit continues to scan a broadcast signal transmitted by base stations located in neighbouring cells. Broadcast signal scanning continues in order to determine if one of the neighbouring base station transmitted signals is strong enough for a handover to be initiated. If so, the cell is added to the active list and this is provided to the radio network which sends appropriate information to the mobile unit and to the second base station to initiate a diversity handover. The second station searches for and finds the mobile station's transmitted signal using the associated spreading code. The second base station also begins transmitting a downlink signal to the mobile station using the appropriate spreading code. The mobile station searches for this downlink signal and sends a confirmation when it has been received. In this embodiment, the second base station searches for mobile units which are probably located in hot spots of the neighbouring cell. By selectively targeting mobile units in a hot spot, communications from these mobile units are immediately placed into soft handover. This avoids the conventional process by which interference levels are allowed to rise due to overloading of the cell before soft handover thresholds are changed.

Figure 6:
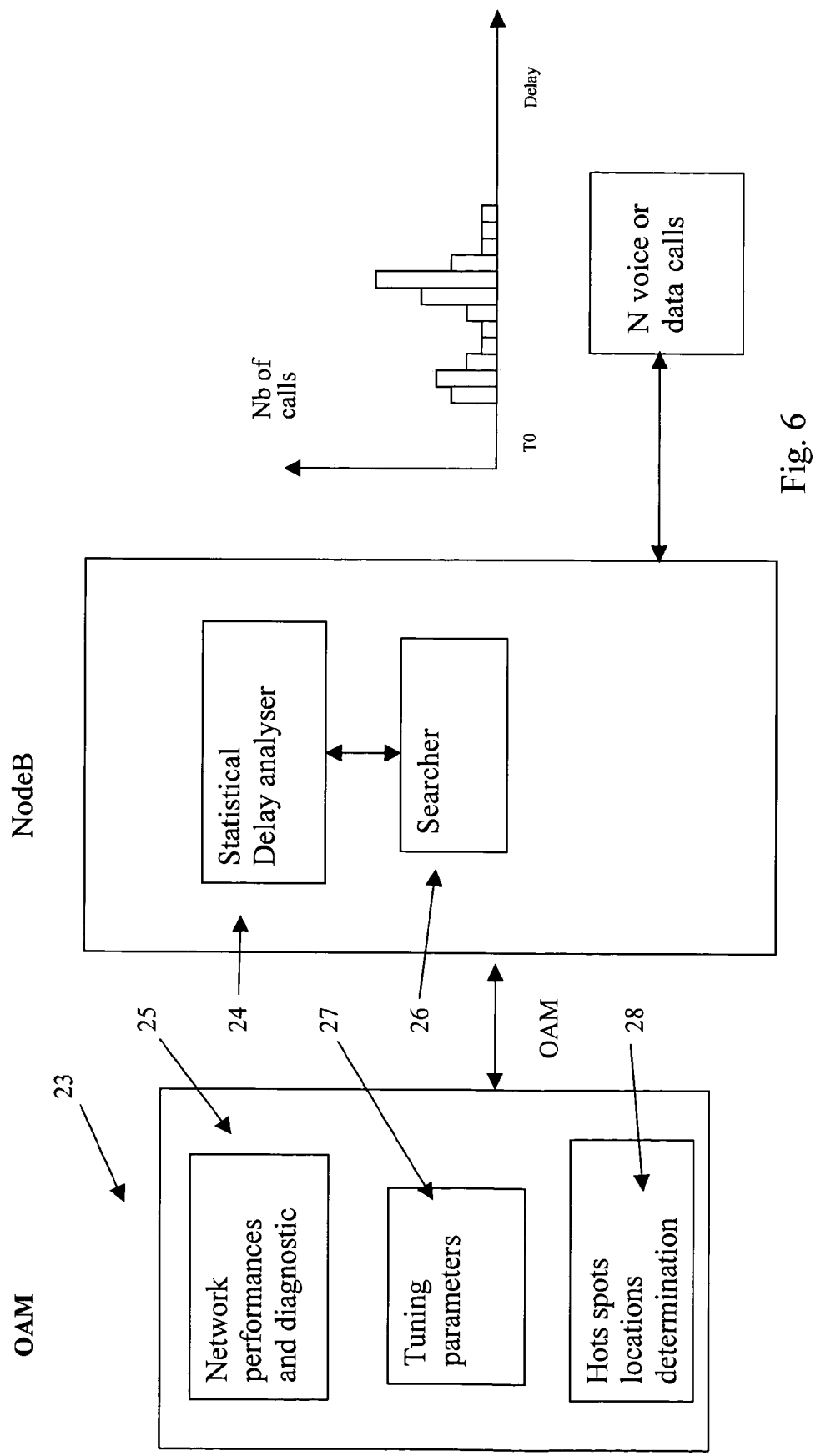
FIG. 6 is a base station arrangement in accordance with the present invention.

One system supporting soft handover is a spread spectrum system such as CDMA. A CDMA receiver, e.g. in a base station system or Node B—see FIG. 6, employs a multipath search processor 26 that searches for and identifies the strongest multipaths along with their corresponding time delays in voice or data calls. For example, a RAKE demodulator captures the received signal energy by allocating a number of parallel demodulators (called RAKE "fingers") to the strongest multipath components of the received multipath signal as determined by the multipath search processor 26.

The searcher 26 identifies the channel impulse response of a complex received signal in order to extract the relative delays of various multipath components. The searcher 26 also tracks changing propagation conditions resulting from movement of mobile units or some other object associated with one of the multipaths to adjust the extracted delays accordingly.

The channel impulse response of a received multipath signal is estimated within a certain range of path arrival times or path arrival delays called a "search window." All signals detected within the search window form the delay profile, but only those signals originated by the transmitter belong to the channel impulse response. The remaining received signals in the delay profile are noise and interference. When the signals forming the delay profile are represented by their respective powers and delays, the delay profile is called a power delay profile. Soft handover requires synchronization of the mobile unit with the second base station and involves the searcher 26 at the second base station. The searcher 26 at the second base station employs a synchronization search window to search for and to detect a transmission of a mobile unit during a handover of a connection to the second base station. As shown schematically in FIG. 6 each Node B is able to record a list of "occupied" significant channels each characterized by a delay from a reference time using the searcher 26. This list is feed to a statistical delay analyser which generates the statistical histogram of delays. The searcher 26 of the first base station provides the delay information for each call. It is worth to note that the RTT (round trip time) is an information which is already sent to the RNC through NBAP and may be used in accordance with the present invention. To have more information to locate more hot spots or the hot spots more precisely, the handover threshold of the cell can be increased, e.g. by a few dBs to have some better statistics. Neighbouring cells are placed in the active set if Ec/NO (current cell)—Ec/NO (candidate cell) is less than the soft handover threshold (typically 4,5 dB)). By increasing the threshold, more cells are placed into the active list and can support soft handover. As location of hot spots is better if more independent measurements are available, the more mobile units in soft handover the more independent base stations can be used for triangulation and therefore the more accurate the location of each communicating mobile unit and the corresponding hot spot.

The information collected by the analyser 24 is then processed by a hot spot determination unit 28. This unit may be located anywhere in the network, e.g. in the Operations and Maintenance (OAM) 23, for example in the SMLC 20 of FIG. 5*b*. The OAM may also include a unit 27 for tuning network parameters in accordance with the present invention as well as a network performance and diagnostic unit 25 which may make use of information on hot spots from the unit 28 in accordance with further embodiments of the present invention. The occurrence densities of communicating mobile units stored in the statistic of unit 24 relate to specific delays and the statistic maintained over these delays can be used by the second base station so that the search window is placed at an optimized delay i.e. a delay corresponding to one of the more delays which could be expected from a mobile unit in a hot spot. By doing this the second base station is preferentially likely to place a mobile unit from a hot spot into soft handover. Subsequently, the whole range of delays to cover can then be explored by sub-sets of most likely delays for hot spot mobile units until all correlations have been done.

In accordance with this embodiment of the present invention the searcher 26 of the second base station preferentially sets a search window so as to accept a delayed transmission which would be generated by mobile units in one or more hot spots in neighbouring cells. By doing this the searcher 26 is likely to detect one of the mobile units in one of these hot spots. The start position for the search window calculated by the searcher 26 depends upon the calculated distance of the relevant hot spot from the second base station. The searcher 26 obtains information about locations of hot spots from the hot spot location determination unit 28. This window start time position is calculated by searcher 26 based on the hot spot co-ordinates provided by the unit 28. The start position is determined by calculating the distance from a relevant or representative geographical co-ordinate position of the hot spot to the geographical co-ordinate position of the second base station. The statistical delay analyser can be situated at any suitable position in the network, e.g. in a radio network control (RNC) node or a base station. The searcher 26 centres its search window about a slot corresponding to the start position in such a way as to preferentially detect mobile units communicating from a hot spot.

Figure 7:
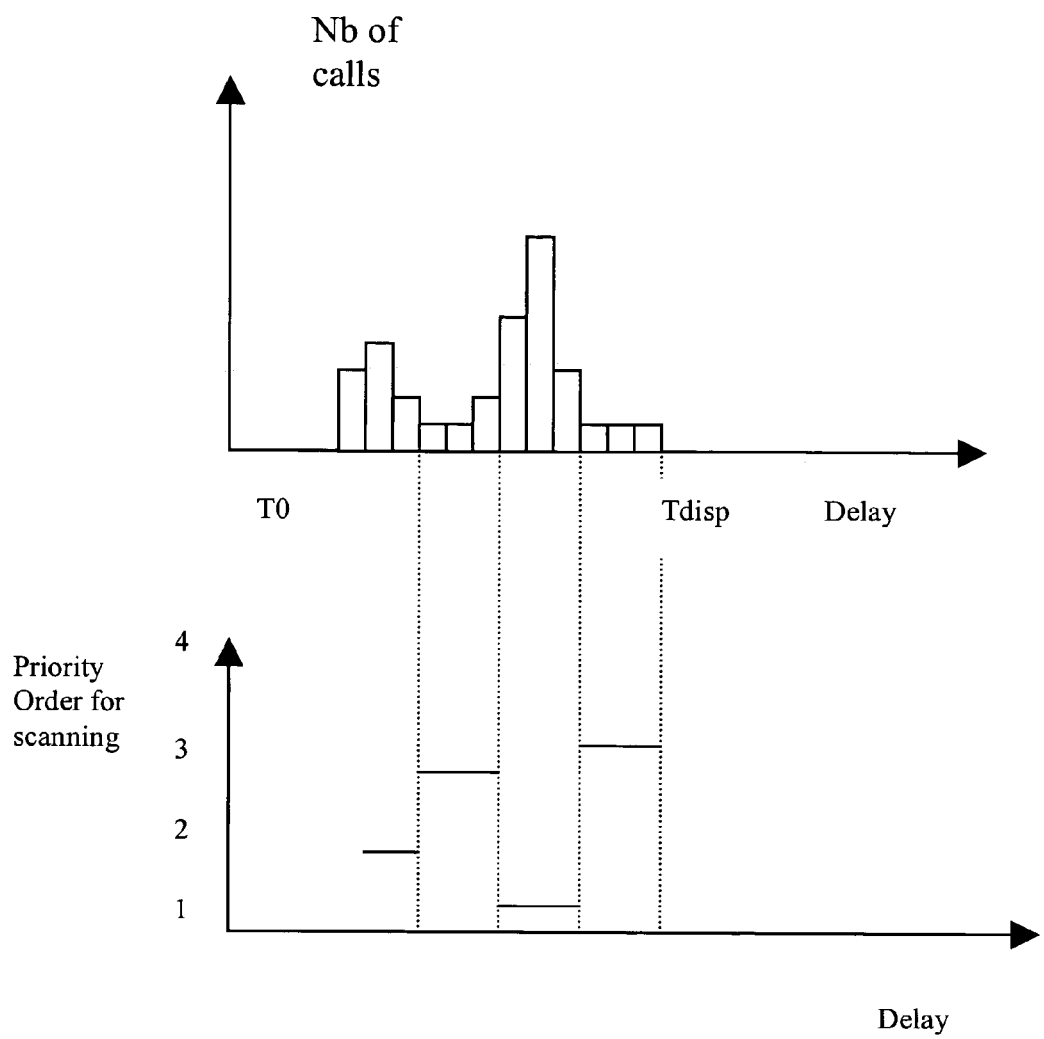
FIG. 7 is a graph showing different delays which may be used to select mobile units for soft handover in accordance with a priority of hot spots.

In accordance with yet another aspect of the present invention, if a mobile unit is not found at the start time position described above, the searcher attempts to find a transmission of a mobile unit by looking at one or more search window positions which relate to the start time position of a second hot spot. The search can be repeated through as many hot spots as necessary until a mobile station unit is found. For example, the hot spots may be ranked in order of size and the searchers of neighbouring cells set the start times of their search windows to detect mobile units from a hot spot in a sequence determined by the priority of the hot spot. As shown schematically in FIG. 7 a histogram statistic has been maintained of delays of communicating mobile units, e.g. incoming or voice and/or data calls. The prioroty order for setting a search window is determined based on the count in the bins of the histogram. The higher the count, the higher the priority.

The invention claimed is:

1. A method of selecting a value of at least one network operating parameter, cell operating parameter, radio resource management parameter or dimensioning parameter for a cellular radio communications network having a base station and mobile units communicating therewith, wherein a statistic is maintained of estimated mobile unit occurrence densities or estimated changes of mobile unit occurrence densities at locations in a cell, wherein each of the locations is defined by a range of values for a parameter which is indicative of distance from the base station and a range of values for a parameter which is indicative of an angle with respect to the base station, and the occurrence density comprises a count of mobile units within the location which is normalized with respect to the area of the location, and the selection of the value of the at least one network operating parameter, cell operating parameter, radio resource management parameter or a dimensioning parameter is made in accordance with an occurrence frequency density stored in the statistic.

2. The method of claim 1, wherein the statistic is determined from delays measured on in-bound voices and data calls.

3. The method of claim 1, wherein the statistic is determined based on angles of arrival measured on in-bound voices and data calls.

4. The method of claim 1, further comprising the step of detecting a hot spot in a cell or cells based on the statistic.

5. The method of claim 1, wherein locations of mobile units are determined from mobile units in soft handover.

6. The method of claim 5, wherein a handover threshold is increased temporarily to increase the number of mobile units in soft handover.

7. The method of claim 5, wherein a call in a hot spot in a cell is automatically placed in soft handover.

8. The method of claim 1, wherein the parameter to be selected is selected from one of:
a sector angle at a base station, an antenna angle or antenna direction, a direction of a beam of a beam former, a modulation or channel coding to be used with a transmission, a puncturing scheme to be used with a transmission, a frequency band to be used for a transmission, a start of a search window for synchronizing to a mobile unit, a spreading code to be used for a transmission, a scrambling code to be used for transmissions.

9. A cellular radio communications network having a base station and mobile units communicating therewith comprising:
means for maintaining and storing a statistic of estimated mobile unit occurrence densities or estimated changes of mobile unit occurrence densities at locations in a cell, wherein each of the locations is defined by a range of values for a parameter which is indicative of distance from the base station and a range of values for a parameter which is indicative of an angle with respect to the base station, and the occurrence density comprises a count of mobile units within the location which is normalized with respect to the area of the location,
means for selecting a value of at least one network operating parameter, cell operating parameter, radio resource management parameter or dimensioning parameter for the cellular radio communications network, the means for selecting to make the selection in accordance with an occurrence frequency density stored in the statistic.

10. The network of claim 9, wherein means for maintaining the statistic comprises means for determining the statistic from delays measured on in-bound voices and data calls.

11. The network of claim 9, wherein means for maintaining the statistic comprises means for determining the statistic based on angles of arrival measured on in-bound voices and data calls.

12. The network of claim 9, further comprising means for detecting a hot spot in a cell or cells based on the statistic.

13. The network of claim 9, wherein the means for maintaining maintains locations of mobile units determined from mobile units in soft handover.

14. The network of claim 13, further comprising means for increasing a handover threshold temporarily to increase the number of mobile units in soft handover.

15. The network of claim 13, further comprising means for automatically placing a call from a hot spot in a cell in soft handover.

16. A network element for use with cellular radio communications network having a base station and mobile units communicating therewith, comprising a module to maintain and store a statistic of estimated mobile unit occurrence densities or estimated changes of mobile unit occurrence densities at locations in a cell, wherein each of the locations is defined by a range of values for a parameter which is indicative of distance from the base station and a range of values for a parameter which is indicative of angle with respect to the base station, and the occurrence density comprises a count of mobile units within the location which is normalized with respect to the area of the location.

17. The network element according to claim 16, further comprising means for analysing the statistic and detecting a hot spot in a cell or cells based on the statistic.

18. The network element according to claim 16, further comprising means for determining a transmission delay from a mobile unit in a detected hot spot and a base station.

19. The network element according to claim 16, wherein the network element comprises at least one of a base station, a location measurement unit, an operations and maintenance unit, a base station controller, and a switching unit, a radio network controller, and a serving mobile location center.

* * * * *